Oct. 10, 1939.　　　M. W. DITTO　　　2,175,181
PRODUCTION OF STEEL
Filed Dec. 1, 1938　　　3 Sheets-Sheet 1

Inventor
M. W. Ditto
By Seymour, Bright & Nottingham
Attorneys

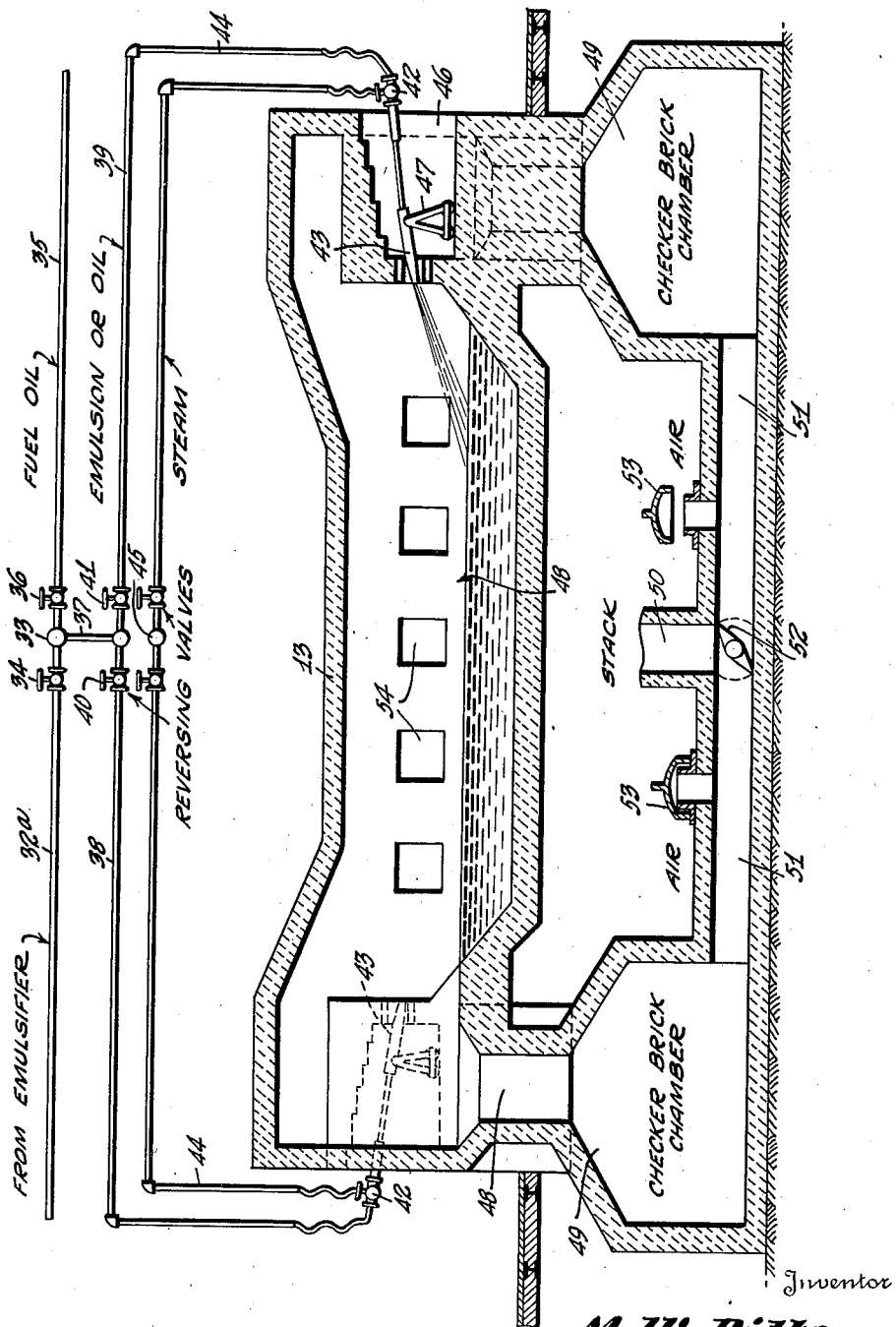

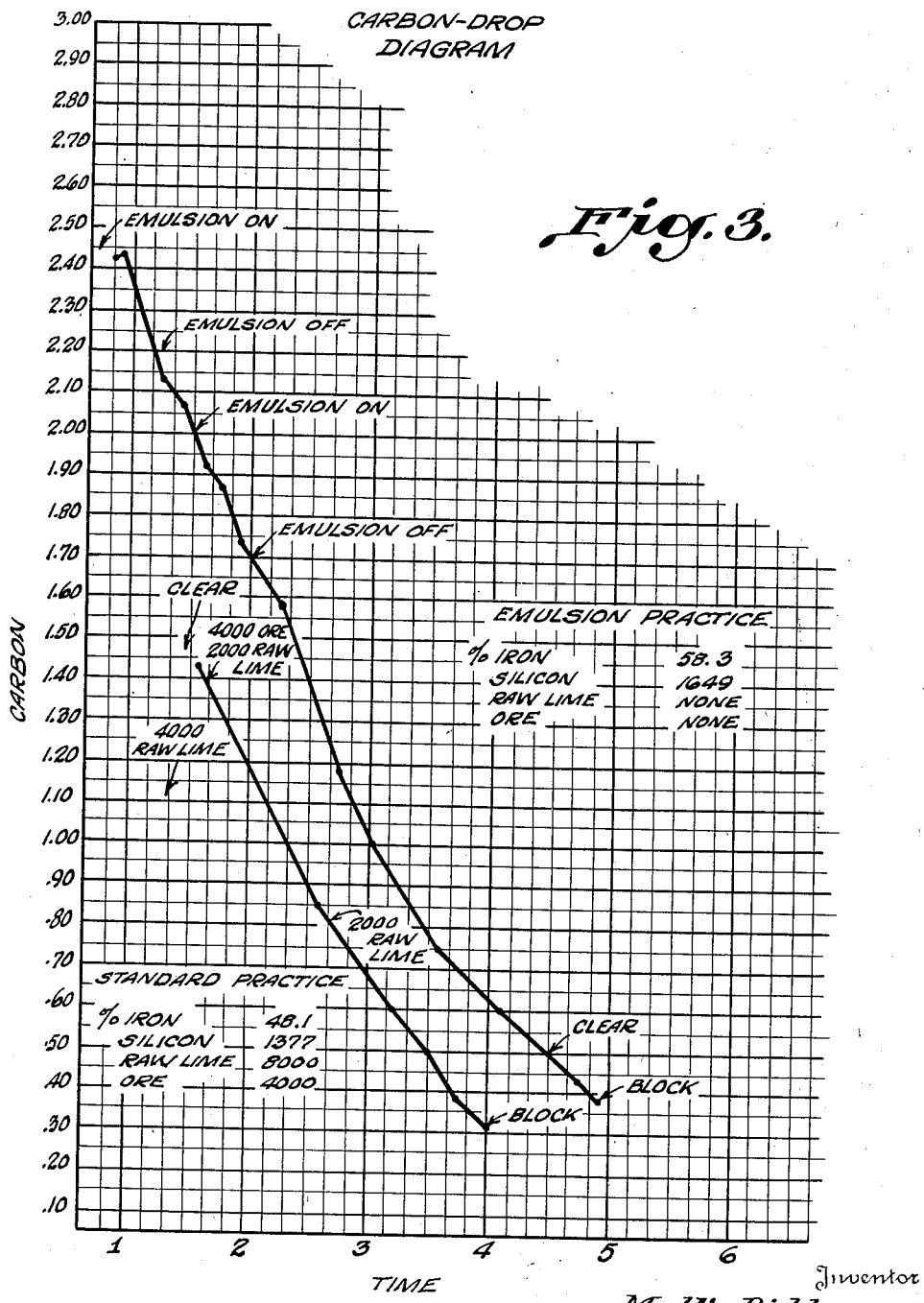

Patented Oct. 10, 1939

2,175,181

UNITED STATES PATENT OFFICE 2,175,181

PRODUCTION OF STEEL

Marvin W. Ditto, New York, N. Y., assignor to Emulsions Process Corporation, New York, N. Y., a corporation of Delaware Application December 1, 1938, Serial No. 243,463

24 Claims. (Cl. 75—45)

This invention relates to the production of steel, and more particularly to a specific example of the basic process disclosed in my application Serial No. 237,544, filed October 28, 1938, of which the present application is a continuation-in-part. The present process may be practiced with the apparatus disclosed in said application, or in any other suitable apparatus.

The desideratum in changing iron into steel is to eliminate the impurities and obtain the proper percentage of carbon for it to meet specifications for the quality of steel required. Two elements enter into this problem, one is the cost of converting the metal and the other is the quality.

The primary purpose of my invention is to provide a method whereby it is possible to produce a better grade of steel directly from high carbon iron charges without the introduction of impurities at a lower cost than by any process heretofore known.

With the foregoing object outlined and with other objects in view as will appear as the description proceeds, the invention consists in the novel features hereinafter pointed out in detail in connection with the accompanying drawings, and set forth in the appended claims.

Referring to the drawing:

Fig. 2 is a longitudinal vertical sectional view of an open hearth furnace.

Fig. 3 is a diagram of two curves, one illustrating steel produced in the conventional manner and utilizing ore as one of the agents for oxidation of carbon, and the other showing the oxidation of carbon by the use of a water-in-oil emulsion in accordance with my invention.

Figure 1:
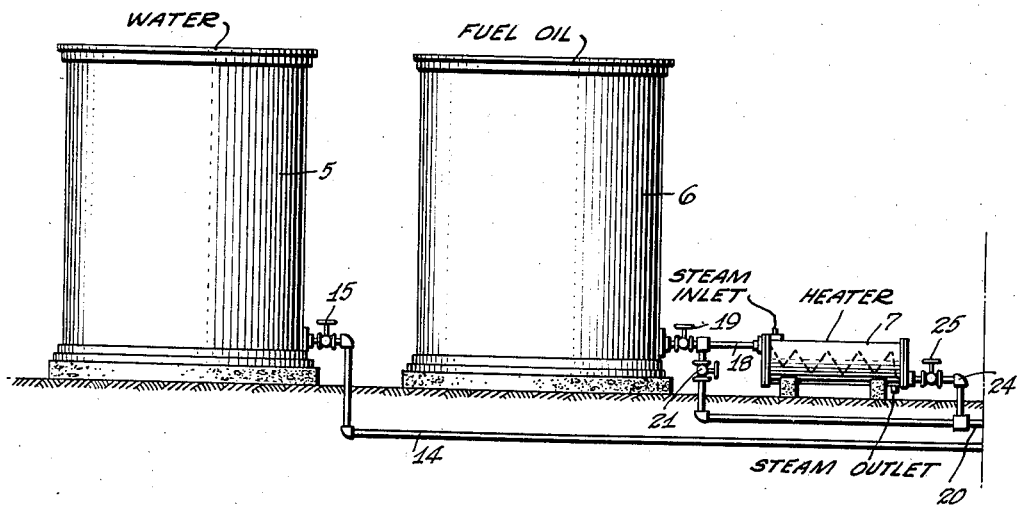
Figs. 1 and 1a are side elevations respectively of a series of units employed in practicing my invention.
Figure 1A:
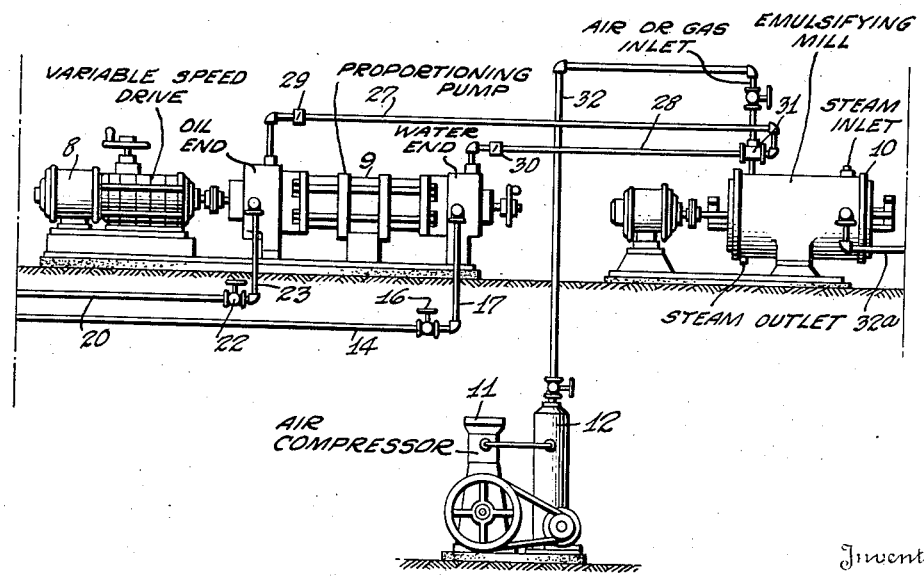

In practicing the invention, I take either hot or cold iron and use it as a starting material. If molten iron direct from a blast furnace is to be used, the bottom of the open hearth furnace is covered with sufficient scrap steel to protect it, or if cold iron is being used, it protects the bottom during the melting period. At the time the scrap steel is charged, raw lime is also charged so as to give an indication as to how the iron is reacting; this lime being but a very small percentage of the lime as ordinarily charged. The raw lime acts as an indicator due to the fact that it is a carbonate and when in contact with hot metal the heat eliminates the $CO_2$ gas and causes turbulence in the metal as the result of the gas percolating through the molten mass.

There is also an interface reaction between the slag forming on the metal and the gases being eliminated, which to the operator is an indication of the reactions in the furnace.

In the case of cold iron, the heating is started and continued by the usual method of firing (that is, it can be either fuel oil or tar, producer gas or any other mixed gas), until the metal is in a molten state and a reaction is noted through the ebullition caused by the hot metal starting to react with the small percentage of lime charged with the scrap. At this point the metal bath will have a temperature of somewhere between 2700° F. to 2900° F.

Conventional heating is then stopped and a rich fuel oil emulsion containing say 25% or more of water is then introduced into the hearth through steam atomizer burners. As a resultant of such introduction, there is a rapid oxidizing effect from the emulsion impinging upon the top of the charge. As the emulsion is introduced at high velocity, it depresses or agitates the thin slag covering or layer causing a rapid formation of iron oxides. This oxide is dissolved in the metal in the form of FeO and in turn reacts upon the silicon and carbon contained in the metal.

The reaction of the formation of the initial iron oxide takes place very rapidly, and the subsequent secondary reaction of the dissolved FeO with the carbon and silicon continues at a rapid rate at the beginning of the reaction due to the law of mass action, inasmuch as the carbon content is rather high. In usual practice, running anywhere between 2 to 4½% of the iron, and the silicon will vary between .45 to 1.50%.

The silica formed through the oxidation of the silicon rises to the top of the bath or pool as a milky white slag, and the rate of the formation of the FeO and the drop in carbon is carefully watched by means of conventional tests taken during suitable intervals.

Inasmuch as the formation of this iron oxide takes place at a greater rate than the secondary reaction of the FeO to react the carbon, care must be taken to shut the emulsion off at an early enough period so that the reaction will be completed by the time the desired carbon is reached. During this period, between the time when the emulsion is shut-off and regular heating is resumed, and the period when the carbon has been oxidized to the desired point, burnt or raw lime is deposited on top of the charge to form the necessary basic slag, if basic open hearth steel is being manufactured; or the necessary fluxing materials are added to form an acid slag if this type of practice is being followed.

Through the elimination of heavy lime charges at the bottom of the bath, the uncertain factor of how long the lime will boil and what the result in carbon drop will be, is eliminated; as the lime is only added later in the heat to form the necessary characteristic slag. With the use of emulsion, the necessity of introducing ore for its iron oxide content, is eliminated, with the resultant impurities that may be present.

In high iron charges, it eliminates the necessity of flushing off the slag formed by the high ore charge used, with the resultant loss in metallic yield and manganese. There is also the danger when introducing ore of "freezing up" the heat with consequent loss of time and quality. There is less danger of such "freezing" when using the emulsion.

Referring now to the drawing, 5 designates a water tank; 6 a fuel oil tank; 7 an oil heater; 8 a variable speed driving mechanism; 9 a proportioning pump; 10 an emulsifying mill; 11 an air compressor; 12 a compressed air storage tank, and 13 an open hearth furnace.

The proportioning pump may be of any suitable construction such as a plurality of pumps of the type described and illustrated in the U. S. Patent to Fenchille, No. 1,289,716. I prefer, however, to use the one disclosed in my application Serial No. 230,480, filed September 17, 1938, as I have found that it gives the desired results in practice. With such a pump, the percentage of the water in ratio to the fuel oil may be varied as desired.

The water tank is connected by a pipe 14 having valves 15 and 16 interposed therein to a pipe 17 leading the water to one end of the proportioning pump. A pipe 18, provided with a valve 19, connects the oil tank to the inlet of the heater 7. Another pipe 20 having valves 21 and 22, connects the pipe 18 to a pipe 23 leading to the oil end of the proportioning pump. A pipe 24 having an interposed valve 25 connects the outlet of the heater to the pipe 20 at a point between the valves 21 and 22. It is obvious from the foregoing that oil may be passed from the tank 6 to the proportioning pump either directly or through the heater. The proportioning pump is driven by the driving mechanism 8, and the pumped oil is discharged through a pipe 27, and the water is discharged through a pipe 28; these pipes being provided respectively with check valves 29 and 30. Pipes 27 and 28 are connected to the inlet 31 of the emulsifying mill, which, like the heater, may be steam heated.

A valved pipe 32 connects the compressed air storage tank 19 to the inlet of the emulsifier.

The outlet pipe 32a of the emulsifying mill leads to a header 33 (Fig. 2), and is provided with a control valve 34. Fuel oil is also conducted to said header through a conduit 35, having a control valve 36. Another conductor 37 leading from the header 33, terminates in branch lines 38 and 39 provided respectively, with valves 40 and 41. The branch pipes are adapted to lead either the emulsion or the fuel oil to the mixing nozzles 42 of burners 43 which are supplied with steam under pressure by valved pipes 44 leading from a header 45.

Each burner extends into a burner opening 46 of the open hearth furnace, and is pivotally mounted on a carriage or truck 47 which not only permits adjustment of the burner toward and away from the hearth 48 of the furnace, but allows the burner to be tilted about a horizontal axis so that fluid fuel discharging from a burner at high velocity will impinge against the surface of the molten metal in the hearth. In use, it is obvious the discharge end of each burner will be spaced some distance from the surface of the metal undergoing treatment.

The furnace is of the conventional regenerator type, and the chamber of the hearth is in communication through passageways 48 with the checker-brick chambers 49; the latter being in communication with the flue or stack 50 by means of passageways 51. Communication of the passageways with the stack is controlled by the usual reversing valve 52. Each passageway 51 is provided with a conventional air valve 53, and when either passageway 51 is shut off from the stack by the valve 52, air will be admitted to that passageway through its valve 53, and such air will, of course, be heated by the brick-work in the chamber 49 that communicates with said passageway before the heated air travels through the passageways 48 into the hearth chamber. The latter is provided with the usual charging doors 54.

In accordance with the invention, the regenerator furnace is used in the conventional way during the heat, that is, gases from the hearth chamber are alternately discharged to the stack 50 through the checker-brick chambers 49, and air is alternately introduced into these chambers and passed to the hearth chamber. Furthermore, during a heat, fuel of some suitable type is introduced into the hearth chamber substantially at all times except when the emulsion is being injected.

In practicing the invention, the hearth may be charged with limestone, scrap steel and cold pig iron, and the charge may be brought to molten condition in the usual way, or the hearth may be charged with limestone and scrap steel which may be brought to molten condition in the conventional manner before the charge is completed by the introduction of hot pig iron from a blast furnace or the like. I also propose to use as a charge, hot pig iron from a blast furnace, which is first introduced into the hearth, and then the emulsion is injected on to the top of the pool, for oxidizing purposes, and then calcined lime is added to the top of the pool.

Regardless of the charge, I propose, when it is in molten condition, to inject an oil-in-water emulsion on to the upper surface of the pool and to use such emulsion for the time required to produce the desired reaction and to oxidize the carbon to the minimum point specified for the resultant steel, and then form the necessary slag.

As the mill 10 operates under the pressures produced by the proportioning pump, the emulsion entering the nozzles 42 of the burners will be under a pressure of from approximately 300 to 400 pounds per square inch, and as the emulsion is mixed in the nozzles with steam under a pressure of about 125 pounds per square inch, the jets alternately discharging from the burners will travel at a speed of about 20,000 feet per minute. Consequently, each jet will not only impinge against the upper surface of the pool, but actually depress the pool at the point of impingement, and set up an agitation or turbulence which functions to increase the speed of the reaction and to rapidly oxidize the carbon in the iron.

Advantages of my process are illustrated by the curves shown in Fig. 3. In that figure, the curve to the left illustrates the production of steel in the conventional manner and utilizing ore as one of the agents for oxidation of carbon, and the one to the right showing the oxidation of carbon by the use of a water-in-fuel oil emulsion containing approximately 25% water.

In examining these curves, it will be noted in standard practice that an iron charge of approximately 280,000 pounds of metal and 18,480 pounds of limestone and consisting of 48.1% of iron and 1,377 pounds of silicon in the total charge of the furnace made it necessary to introduce 4,000 pounds of ore (this must be the highest grade of ore procurable), and 8,000 pounds of limestone in order to oxidize the carbon to approximately .30, whereas in accordance with my invention, with an iron charge of 58.3% containing 1,649 pounds of silicon or nearly 300 pounds more than in standard practice, no ore was necessary to oxidize the carbon to .38, and the emulsion was only used for less than an hour period (these curves being representative of actual performance).

It will be noted from the right-hand curve that the emulsion was used during different periods of time, and as it can be used for short periods at various times during the heat, close metallurgical control is possible with my method.

It is necessary to convert this silicon into silica in the form of slag before the iron can be properly decarbonized. Therefore, the superiority of my process is shown, in that a large percentage of iron running high in silicon was treated, and the use of excess lime and ore was eliminated during the period of oxidizing the iron to steel. The elimination of the silicon from the iron begins to take place immediately upon the melting of the iron and by the use of the emulsion as an oxidizing agent. The rate with which the silicon is separated is due to the greater activity of the action of the emulsion upon the metal which allows the reaction of oxidizing the carbon to take place earlier during the processing period.

The longer the period iron has to remain in the furnace for conversion into steel, the more fuel is required, therefore, the greater the cost.

In practicing the process, I prefer to employ a proportioning pump of the type disclosed in my application Serial No. 230,480, filed September 17, 1938, as it enables me to change the proportions of fuel oil and water used in the emulsion at any time during the steel making period. Using such a pump, I can produce a fuel oil emulsion containing, say 5 to 10% of water, and use this in the beginning to heat the charge up to the point where slag forms on the surface of the pool. Then I can raise the percentage of water in the emulsion to say 25% or 35% and use this as a fuel and oxidizing agent in the furnace during decarbonization of the iron for the period required to oxidize the carbon to any desired point to meet the specification of the steel.

I may also start the heat with a water-in-fuel oil emulsion containing say 5% to 7% of water and use it throughout the early stages of the heat; then increase the percentage of water in the emulsion to about 20% to 35% and inject such emulsion during the middle of the heat; and finally reduce the water percentage in the emulsion and use it during the latter part of the heat. In all cases the emulsion will be injected for a time sufficient to oxidize the carbon content of the charge to a predetermined degree.

In making the emulsion, I prefer to employ apparatus of the type disclosed in the patent to R. H. Russell, No. 2,059,535, or apparatus of the type disclosed in my applications Serial Nos. 196,780 and 218,883, filed March 18, 1938 and July 12, 1938, respectively.

Such emulsion or its equivalent is introduced into the molten metal in the form of a jet or jets at high velocities, so that it impinges on the upper surface of the metal pool with considerable force. By using the emulsion I am able to reduce the amount of oxidizing ores employed in making steel. As I reduce or entirely eliminate such materials, which are usually introduced in cold condition into the furnace for the purpose of oxidizing the carbon, I, of course, save the fuel required to heat such cold materials. By observing the drop of carbon in the pool, and regulating the period the emulsion is on in the furnace, better control of furnace conditions are available and thereby steel is made at a faster rate and better quality.

As an equivalent of such emulsion I believe I can employ a jet or jets made up of concentric streams of any suitable fuel and water which would be intimately mixed with steam before these combined materials are discharged at high velocity on to the surface of the pool. In such a case, a stream of fuel traveling at high velocity would be surrounded by an annular stream of water also traveling at high velocity. These streams would be intimately mixed with steam under high pressure and the combination jet thus formed would be impinged against the pool.

The process can be practiced in the same manner with cold or hot metal. In other words, if I start with cold metal in the hearth, I will heat it up to the point where slag forms, and then burn in the hearth a fuel oil emulsion containing a relatively high percentage of water, and continue to inject this emulsion until the carbon has been oxidized to the point required.

I have found from practicing the invention that the carbon drop in the furnace can accurately be controlled by firing emulsion having 25% or more water, and that the reaction is the same as though ore were charged for the same purpose, but that the oxidation of carbon per unit of time is much greater when using ore.

The process lends itself to practical operation, because it can be easily and accurately controlled, and by watching carefully the carbon drop, the emulsion can be shut off or the water percentage in it reduced to the point where the oxidizing effect is reduced to a minimum and the final refining done under conditions best suited to the particular grade of steel being made. Using hot metal there is no reason why a very large percentage of blast furnace molten iron cannot be used for the charge, using only enough scrap steel to protect the bottom of the hearth during the early part of the reaction. Furthermore, by using a high iron charge, it eliminates the impurities which are necessarily present in scrap iron, acquired from various sources, particularly tin and copper which cannot be eliminated and which progressively build up as time goes on. With the use of a high iron charge, particularly where cold iron is charged, the time of heat is reduced because of the lower melting point of the pig iron as compared with scrap steel. Here there is an ideal condition present, inasmuch as the iron melting at a low temperature allows the reaction of oxidation to start as soon as the melt is molten, and as the carbon is removed, raising the melting point of the metal, the necessary additional heat is supplied by both the emulsion burning and the heat released through the reaction due to the formation of iron oxide.

In reference to terms used in this specification, it will be noted that the term "pig iron" generally applies to iron from a blast furnace cast into pigs, that is, the iron from the furnace which is deposited in a mold or molds and molded to weight and size so that it can be picked up and handled by a man. Iron from a blast furnace being transferred to the open hearth department in a molten condition is not pigged or molded into small units, and consequently it is not called "pig iron", but is known as "hot iron" to distinguish it from "pig iron" or "hot steel".

The terminology of the different metals is one of common usage and to understand them it is necessary to assume that iron containing carbon is "iron" whereas if the carbon content is reduced below a certain point, the iron becomes "steel". Therefore, when using the expression "high iron charges" I mean the charge going into the open hearth furnace is high in iron, which might be pig iron in a cold state or hot iron from the ladle which if cast into pigs would be called pig iron. In other words, the expression, "high iron charges" means that the ratio of iron, either pig or hot iron from the blast furnace is high with relation to the amount of scrap steel that makes up the total metal charge.

Attempts have been made to oxidize carbon by means of steam and water, and I believe they have been unsuccessful in practice, because of the fact that the so-called steaming of the heat will only oxidize the carbon perhaps one point, and unfortunately allow the charge to cool off with the danger of "freezing up" the heat which requires considerable length of time for release, so that instead of gaining time, time is lost. I also believe that introduction of water alone into the heat reacts in quite the same way. In the first place, it "freezes up" the metal bath, and in the second place, the reaction is violent in a highly localized area, and whereas, no doubt, it will form a high FeO content at the point of contact, it is again necessary to spend some hours of time to remelt the heat so that the FeO thus formed can react with the balance of the iron charge. From a mechanical viewpoint, it is impractical in operating such furnaces to introduce either steam or water or other oxidizing agents into the steel bath. From a metallurgical viewpoint it has the same objections as Bessemer steel has, that is, by introducing the flow of gas through the steel there is a high absorption in the molten state of certain of these gases which tend to form sonims in the finished steel. For example, Bessemer steel used as a starting product for making duplex iron in open hearth furnaces always shows traces of nitride iron which can be readily seen under a microscope in the finished steel. The proper application of my emulsion fuel should eliminate all the mechanical and metallurgical objections having the rapidity of reaction of the Bessemer process while producing a high quality basic or acid open hearth steel without the usual impurities connected with Bessemer practice.

The percentage of air induced is small but it augments the normal supply of air in the furnace to speed up the rate of combustion. However, the induced air is not more than one per cent of the total air required for combustion in the furnace. Therefore, the percentage of nitrogen added to the furnace gases or brought in contact with the metal is much lower than would come in contact with the metal in Bessemer furnaces because this air is not blown through the metal.

While I have disclosed what I now consider to be preferred methods of practicing my invention, I am aware that changes may be made in the details disclosed, without departing from the spirit of the invention, as expressed in the claims.

What I claim and desire to secure by Letters Patent is:

1. In the production of steel, introducing lime and ferric scrap metal into an open hearth furnace, melting the scrap metal and then introducing cold iron, melting the cold iron, then injecting a water-in-oil emulsion onto the pool of metal for a period of time sufficient, in conjunction with the lime boil, to oxidize the carbon, and maintaining the pool in molten condition during the injection of the emulsion by burning fuel in proximity to the point at which the emulsion is contacted with the pool.

2. In the production of steel, placing ferric scrap metal on the bottom of an open hearth furnace in the absence of lime, melting the scrap metal, charging iron into the hearth, bringing the mass to molten condition, injecting a water-in-oil emulsion onto the top of the mass for a period of time sufficient to oxidize the carbon and reduce the carbon content of the charge to a desired minimum, maintaining the mass in molten condition during the injection of the emulsion by burning fuel in proximity to the point where the emulsion contacts the mass and adding lime on top of the molten bath until a basic slag is formed.

3. In the production of steel, placing scrap steel on the bottom of a furnace, melting said scrap steel, then introducing hot blast furnace iron in molten condition into the melted scrap steel, then injecting a water-in-oil emulsion onto the mass for a period of time sufficient to oxidize the carbon to the desired point, maintaining the mass in molten condition during the injection of the emulsion by burning fuel in proximity to the point at which the emulsion is contacted with the mass and adding sufficient lime to the molten bath to build up the basic slag.

4. In the production of steel, introducing molten pig iron from a blast furnace into the hearth of an open hearth furnace, placing calcined lime on the top of the pool of iron in the hearth, and injecting an atomized water-in-fuel oil emulsion at high velocity onto the top surface of the pool for a period of time sufficient to reduce the carbon content of the pool to a predetermined degree without adding any additional oxidizing agent, and preventing undue chilling of the contents of the pool during the injection of the emulsion by burning fuel in proximity to the point at which the emulsion is contacted with the pool.

5. In the production of steel, lining the hearth of an open hearth furnace with ferric scrap metal and a slag-producing agent, subsequently introducing a charge of iron from a blast furnace into the hearth, heating the combined charge in the hearth and thereby producing slag at the top of the pool, and then injecting an atomized water-in-fuel oil emulsion at high velocity onto the top surface of the pool for a time sufficient to reduce the carbon content of the charge to a predetermined degree, and preventing undue chilling of the charge during the injection of the emulsion by burning fuel in proximity to the point at which the emulsion is contacted with the charge.

6. In the production of steel, lining the hearth of an open hearth furnace with ferric scrap metal and a fluxing agent, melting the scrap metal, then introducing a molten charge of iron into the hearth, heating the materials in the hearth and thereby producing slag at the top of the pool formed by said materials, reducing the carbon content of the pool to a predetermined degree substantially solely by injecting an atomized water-in-fuel oil emulsion at high velocity onto the top surface of the pool, and preventing undue chilling of the contents of the pool during the injection of the emulsion by burning fuel in proximity to the point at which the emulsion is contacted with the surface of the pool.

7. In the production of steel, injecting an atomized water-in-fuel oil emulsion containing less than 20% of water at high velocity onto the top surface of an iron charge in an open hearth furnace throughout the early stages of the heat, then increasing the percentage of water in the emulsion to about 20 to 35% and injecting such emulsion during the middle of the heat, then reducing the water percentage in the emulsion and using the emulsion during the latter part of the heat, and preventing undue chilling of the charge during such injection by burning fuel in proximity to the point at which the emulsion is contacted with the charge.

8. In the production of steel, injecting an intimate mixture of water and fuel in atomized condition and at high velocity onto the upper portion of a pool of molten iron containing impurities and burning such mixture at the upper portion of the pool for a period of time sufficient to oxidize the carbon content of the pool to a predetermined degree.

9. In the production of steel, injecting an atomized water-in-fuel oil emulsion at high velocity onto the top surface of a pool of molten iron covered with a layer of slag, and thereby increasing in activity the interface reactions between the slag and the iron and causing the rapid formation of iron oxides both in the slag and iron, and preventing undue chilling of the molten pool during the injection of the emulsion by burning fuel in proximity to the point at which the emulsion is contacted with the surface of the pool.

10. In the production of steel, injecting atomized water and fuel oil at high velocity onto the top surface of a pool of molten iron containing impurities, maintaining a flame immediately above the pool so as to form water gas within the flame and dissociate the excess water to form oxygen and hydrogen gas, causing a reaction between the oxygen released from the water and the iron and slag, and causing a reaction between the iron oxides and the carbon which is oxidized by the iron oxides.

11. In the conversion of ferric metal high in carbon into steel, injecting an emulsified fuel having water as a component thereof, into contact with the upper surface of a molten pool of such metal, and burning said fuel and thereby maintaining the metal in molten condition and forming ferric oxides.

12. In the conversion of ferric metal high in carbon into steel, raising the temperature of such metal to bring it to molten condition, and then injecting an emulsified fuel having water as a component thereof into contact with the mass while preventing undue chilling of the mass by burning fuel in proximity to the point at which the emulsion is contacted with the mass, and thereby reducing the carbon content of said metal.

13. In the conversion of ferric metal high in carbon into steel in the presence of lime, raising the temperature of a mass of such metal to bring it to molten condition, and then injecting an emulsified fuel having water as a component thereof into contact with the molten mass while preventing undue chilling of the mass by burning fuel in proximity to the point at which the emulsion is contacted with the mass.

14. In the conversion of ferric metal high in carbon into steel, injecting an emulsified fuel having water as a component thereof into contact with a mass of such metal while maintaining the metal in molten condition and preventing undue chilling thereof by burning fuel in proximity to the point at which the emulsion is contacted with the mass, and thereby forming ferric oxides and rapidly reducing the carbon.

15. In the conversion of ferric metal high in carbon into steel, producing an emulsion of fuel oil and water in which the water is present in a percentage above 5% of the emulsion, and then substantially continuously injecting said emulsion at high velocity into contact with a mass of such metal while maintaining the latter in molten condition by burning fuel in proximity to the point at which the emulsion is contacted with the mass.

16. In the conversion of a ferric metal containing an excess of carbon into steel, maintaining a mass of such metal in molten condition by injecting an atomized water-in-oil emulsion toward the upper surface of said mass and burning the emulsion at such surface.

17. In the conversion of a metal containing iron high in carbon into steel, injecting a jet of an atomized fuel having water as a component thereof at high velocity from a point spaced from the upper surface of a molten pool of such metal, into contact with said surface, and substantially continuously burning said fuel above said surface and thereby maintaining the metal in molten condition.

18. In the conversion of a ferric metal containing an excess of carbon into steel, injecting a jet of emulsified fuel having water and air as components thereof at high velocity from a point spaced from the upper surface of a molten pool of such metal, into contact with said surface and simultaneously burning said fuel and thereby maintaining the metal in molten condition to substantially the end of the heat.

19. In the conversion of a material containing iron high in carbon into steel, injecting a stream consisting mainly of fuel oil in atomized condition at high velocity onto the surface of a pool of such material, simultaneously injecting a stream consisting mainly of water in atomized condition at high velocity onto said surface, and preventing undue chilling of such material during the injection of the water, by burning fuel in close proximity to the point at which the last-mentioned stream is contacted with said surface.

20. In the conversion of a material containing iron high in carbon into steel, injecting a stream consisting mainly of fuel oil in atomized condition and at high velocity onto the surface of a pool of such material, simultaneously injecting a stream consisting mainly of water in atomized condition and at high velocity onto said surface, causing said streams to contact with the surface of the material at substantially the same point, and preventing undue chilling of the material by burning fuel at said point.

21. In the conversion of ferric metal high in carbon into steel, injecting an emulsified fuel having water as a component thereof into contact with the upper surface of a molten pool of such metal, and burning said fuel and thereby reducing the silicon to convert it into a slag and rapidly advance the reduction of the carbon content of such metal.

22. In the conversion of a material containing iron high in carbon into steel, injecting an atomized stream of water at high velocity and in the presence of a fuel onto the upper surface of a molten pool of such metal while maintaining the pool in situ, and preventing undue chilling of the material during such injection by burning fuel in proximity to the point at which the stream is contacted with such material.

23. In the conversion of a material containing iron high in carbon into steel, injecting an atomized stream of water at high velocity and in association with an atomized fuel from a position above the surface of a molten pool of such material and into contact with the material while maintaining the pool in situ, and preventing undue chilling of the material during such injection by burning fuel in proximity to the point at which the stream is contacted with the material.

24. In the conversion of ferric metal high in carbon in an open hearth furnace into steel, initiating and maintaining turbulence in a molten pool of such metal for a predetermined period of time by injecting an emulsified fuel having water as a component thereof into contact with the upper surface of said pool, and burning said fuel immediately above said surface and thereby maintaining the metal in molten condition and forming ferric oxides.

MARVIN W. DITTO.